United States Patent [19]
Ikeda

[11] Patent Number: 5,952,447
[45] Date of Patent: Sep. 14, 1999

[54] PHENOL RESIN COMPOSITION AND METHOD OF PRODUCING PHENOL RESIN

[75] Inventor: Takashi Ikeda, Chiba, Japan

[73] Assignee: Dainippon Ink and Chemicals, Inc., Tokyo, Japan

[21] Appl. No.: 09/074,404

[22] Filed: May 8, 1998

[30] Foreign Application Priority Data

May 9, 1997 [JP] Japan ................................ 9-119389

[51] Int. Cl.$^6$ ........................... C08G 14/10; C08L 61/34
[52] U.S. Cl. .............................. 528/163; 528/98; 528/99; 528/149; 528/152; 528/159; 525/489; 525/490; 525/502; 525/504
[58] Field of Search ..................................... 525/489, 490, 525/502, 504; 528/98, 99, 149, 152, 159, 163

[56] References Cited

U.S. PATENT DOCUMENTS 2,826,559  3/1958  Updegraff et al. ...................... 528/163

FOREIGN PATENT DOCUMENTS 54-070395   6/1979   Japan .
60 090 213  10/1983  Japan .
08 183 827   7/1996  Japan .
A-8-311142  11/1996  Japan .

*Primary Examiner*—Frederick Krass
*Attorney, Agent, or Firm*—Armstrong, Westerman, Hattori, McLeland & Naughton

[57] ABSTRACT

Disclosed is a phenol resin composition containing a specific triazines-modified novolak phenol resin comprising phenols, triazines and aldehydes, and a method for producing the triazines-modified novolak phenol resin comprising the steps of as a first step reaction, successively effecting processes (i), (ii) and (iii), wherein said process (i) is a process for adjusting a pH of a system of a mixture of phenols, triazines and aldehydes in a range of 5 to 10, said process (ii) is a process for reacting said mixture under the condition that the aldehydes are not volatilized and said process (iii) is a process for removing a reaction water in the system; then as a second step reaction, successively effecting said processes (ii) and (iii) at a higher temperature than that of the first step reaction; thereafter as a third step reaction, successively effecting said processes (ii) and (iii) at a higher temperature than that of the second step reaction; and further, depending upon a necessity, repeating the second step reaction and the third step reaction, whereby a dimethylene ether bond in the molecule is converted to a methylene bond.

13 Claims, No Drawings

PHENOL RESIN COMPOSITION AND METHOD OF PRODUCING PHENOL RESIN

FIELD OF THE INVENTION

The present invention relates to a phenol resin composition and the method of the production of a phenol resin. Particularly, it relates to a phenol resin composition suitably used for various objects because of its excellent properties as set forth below and the method of the production of a phenol resin: When the phenol resin composition is used as an epoxy hardener, it can provide a hardened product excellent in flame retardancy, heat resistance, moisture resistance and metal adhesion. Therefore, the phenol resin composition is suitable for various uses utilizing an epoxy resin such as sealing, lamination and paint, particularly suitable for a glass epoxy laminated sheet and IC encapsulating material; Further, since the phenol resin composition is excellent in friction property and dielectric property, it is suitable for a friction material and molding material which use, as a hardener, hexamethylenetetramine and a compound comprising an unsaturated ethylene group; Still further, since the use together with a resol resin can provide a hardened product which is excellent in low temperature punching quality and flame retardancy, the phenol resin composition is suitable for a paper base laminated sheet.

BACKGROUND OF THE INVENTION

An epoxy resin is widely used mainly in the field of an electric and electronic material parts because of its excellent electric properties.

These electric and electronic material parts are required to have high flame retardancy as represented by a glass epoxy laminated sheet or an IC encapsulating material. However, an epoxy resin alone cannot produce a sufficient effect. Therefore, now, a halogen flame retardant is often being used in combination with this epoxy resin.

Recently, however, the toxicity of organic halogen substances typically represented by dioxin (chlorodibenzodioxin) has become a serious problem and undesirable effects of halogen are exerted on a long-term reliability in IC packages. It is strongly requested to reduce a use amount of halogen or to use a flame retardant using a compound substitutable with halogen or other flame retardant formulations.

Accordingly, a method of addition of a flame retardant such as a phosphorus compound has been under consideration. According to this method, however, flame retardancy is improved, but basic physical properties of a resin such as heat resistance and moisture resistance are undesirably damaged.

In order to eliminate these disadvantages, in JP-A 8-311142 (the term "JP-A" as used herein means an unexamined published Japanese patent application), is proposed the use of a phenol composition modified with a compound having a triazine ring as an epoxy resin hardener.

When this compound is used as a hardener, however, a bond between phenol and a triazine compound is not sufficient. Therefore, the resulting hardened product does not have sufficient characteristics, for example, in heat resistance and moisture resistance, although it shows a flame retardant effect. Thus, the above-described problems cannot be solved.

While, a conventional thermosetting resin composition for a friction material using hexamethylenetetramine as a hardener also has a problem of so-called "noise", which also cannot be solved yet by the above-described technique.

Further, when the compound is used in a paper base laminated sheet, although the resulting paper base laminated sheet shows a flame retardant effect, a problem arises wherein a low temperature punching quality is insufficient.

SUMMARY OF THE INVENTION

The object of the present invention is to provide a phenol resin composition suitably used for various objects because of its excellent properties as set forth below and the method of the production of a phenol resin: When the phenol resin composition is used as an epoxy resin hardener, it can improve flame retardancy without employing halogen and can provide a hardened product excellent in flame retardancy, heat resistance, moisture resistance and metal adhesion. Therefore, it is suitable for various uses utilizing an epoxy resin such as sealing, lamination and paint, particularly suitable for a glass epoxy laminated sheet and IC encapsulating material; Further, since the phenol resin composition is excellent in friction property and dielectric property, it is suitable for a friction material and molding material which use, as a hardener, hexamethylenetetramine and a compound comprising an unsaturated ethylene group; Still further, since the use together with a resol resin can provide a hardened product which is excellent in low temperature punching quality and flame retardancy, the phenol resin composition is suitable for a paper base laminated sheet.

In view of the above-described circumstances, the present inventors have conducted extensive study and research efforts. As the result, it could be found that an phenol resin composition comprising a novolak resin having a specified bonding ratio between phenols and triazines could achieve the above-described object. Thus, the present invention could be completed.

In accordance with the present invention, there is provided the following phenol resin composition and the process for producing the phenol resin:

(I) A phenol resin composition containing a triazines-modified novolak resin comprising phenols, triazines and aldehydes, wherein said novolak resin comprises a mixture of (a) a condensate of phenols, triazines and aldehydes, (b) a condensate of triazines and aldehydes, (c) a condensate of phenols and aldehydes, (d) phenols and (e) triazines, and a constituent unit (A) represented by the following general formula (1) and a constituent unit (B) represented by the following general formula (2) are included in said condensate (a) and said condensate (b) at a molar ratio satisfying the following formula (3);

$$(-X-NH-CH_2-NH-) \quad (1)$$

$$(-X-NH-CH_2-Y-) \quad (2)$$

wherein X represents a residual group of triazines, Y represents a residual group of phenols $$B/A \geq 1.5 \quad (3);$$

(II) The phenol resin composition as described in (I) above, wherein a molar ratio of triazines in the condensate (a) and the condensate (b) is 30% or more of the total triazines;

(III) The phenol resin composition as described in (I) above, wherein the triazines are one or two or more compounds selected from the group consisting of melamine, acetoguanamine and benzoguanamine;

(IV) The phenol resin composition as described in (I) above, wherein the phenol resin composition further comprises a hardener, and the hardener is hexamethylenetetramine or a compound having at least two unsaturated ethylene groups in its molecule;

(V) The phenol resin composition as described in (I) above, wherein the phenol resin composition further comprises a resol resin;

(VI) A hardener for an epoxy resin comprising the phenol resin composition described in (I) above as a main component;

(VII) A binder for a friction material comprising the phenol resin composition described in (I) above as a main component;

(VIII) A binder for a paper base laminated sheet comprising the phenol resin composition described in (I) above as a main component;

(IX) A method for producing a triazines-modified novolak phenol resin comprising the steps of:

as a first step reaction, successively effecting processes (i), (ii) and (iii), wherein said process (i) is a process for adjusting a pH of a system of a mixture of phenols, triazines and aldehydes in a range of 5 to 10, said process (ii) is a process for reacting said mixture under the condition that the aldehydes are not volatilized and said process (iii) is a process for removing a reaction water in the system;

then as a second step reaction, successively effecting said processes (ii) and (iii) at a higher temperature than that of the first step reaction;

thereafter as a third step reaction, successively effecting said processes (ii) and (iii) at a higher temperature than that of the second step reaction; and further, depending upon a necessity, repeating the second step reaction and the third step reaction, whereby a dimethylene ether bond in the molecule is converted to a methylene bond; and (X) The method for producing a triazines-modified novolak phenol resin as described in (IX) above, wherein the molar ratio between the phenols and the triazines, and the aldehydes is 1:0.2 to 0.9.

DETAILED DESCRIPTION OF THE INVENTION

The above-described phenols for obtaining the phenol resin composition according to the present invention are not particularly limited. The examples of the phenols include phenol; alkyl phenols such as cresol, xylenol, ethyl phenol, butyl phenol, nonyl phenol and octyl phenol; polyhydric phenols such as bisphenol A, bisphenol F, bisphenol S, resorcin and catechol; halogenated phenol; phenyl phenol; and aminophenol. They can be used alone or in any mixture thereof.

While, a compound comprising a triazine ring used in the phenol resin composition according to the present invention is not particularly limited. Namely, any compound can be used regardless of the structure as long as they comprise a triazine ring. However, melamine, acetoguanamine or benzoguanamine is preferable.

Such compounds including a triazine ring can be used alone or in any mixture thereof.

Aldehydes for obtaining the phenol resin composition according to the present invention are not particularly limited. However, in view of the easiness in handling, formaldehyde is preferable. The formaldehyde is not particularly limited. As the typical supply source thereof, formalin and p-formaldehyde can be mentioned.

The novolak resin in the present invention means resins substantially free from a methylol group and is characterized by comprising no unreacted aldehyde.

Since the novolak resin does not substantially comprise a methylol group and an unreacted aldehyde, when it is used as a hardener for an epoxy resin, it has an effect that the compounding stability with the epoxy resin is extremely high.

While, an amount of an unreacted monofunctional phenol monomer included in the novolak resin of the present invention is not particularly limited. However, 3% by weight or less is preferable. In such an amount of the unreacted monofunctional phenol monomer, the compounding stability with an epoxy resin is improved so that the resulting epoxy resin hardened product is improved in thermal resistance and moisture resistance.

The unreacted monofunctional phenol monomer herein means a phenol monomer comprising only one phenolic hydroxyl group reactable with an epoxy group in one molecule.

The phenol resin composition of the present invention includes a triazines-modified novolak resin comprising phenols, triazines and aldehydes. The phenol resin composition is characterized in that in the novolak resin, a constituent unit (A) represented by the general formula (1) and a constituent unit (B) represented by the general formula (2) are included in (a) a condensate of phenols, triazines and aldehydes, and (b) a condensate of triazines and aldehydes at a molar ratio satisfying the following formula (3);

  (1)

  (2)

wherein X represents a residual group of triazines, Y represents a residual group of phenols $$B/A \geq 1.5 \qquad (3).$$

The case of $B/A \geq 3$ is more preferable. In the case of $B/A < 1.5$, miscibility with an epoxy resin or reactivity with hexamethylenetetramine become worse, which may lead to the decrease in heat resistance and friction resistance.

The molar ratio between the constituent unit A and the constituent unit B defined in the present invention can be determined from a chart of nuclear magnetic resonance spectrum (hereinafter referred to as 13C-NMR). Namely, when the determination is effected under the conditions of conventional methods using, as a determination solvent, dimethyl sulfoxide (hereinafter referred to as DMSO) or acetone-$D_6$ and, as a standard substance, tetramethylsilane, it has been known that the peak of the constituent unit B appears in a range of 42.5 to 45 ppm of 13C-NMR chart and the peak of the constituent unit A appears in a range of 47 to 48.5 ppm of the same. Thus, by calculating the ratio of the integral values of both peaks, the molar ratio between the constituent unit A and the constituent unit B can be obtained.

In the triazines-modified novolak resin of the present invention, the molar ratio of triazines in the condensate (a) and the condensate (b) is not particularly limited. However, it is preferable that the ratio is 30% or more of the total triazines. If the ratio is 30% or less, the triazines-modified novolak resin is to have a decreased heat resistance and moisture resistance.

The molar ratio of the triazines can be obtained from 13C-NMR chart as in the above-described constituent units A and B. That is, a sharp peak appearing in a range of 167.2 to 167.4 ppm of the chart can be estimated to be derived from unreacted triazines (the integral value of the peak is defined as Tm), while a broad peak appearing in a range of 163 to 167.2 ppm can be estimated to be derived from triazines reacted with formaldehyde (the integral value of the peak is defined as Tr). The molar ratio of triazines in the above-described condensates (a) and (b) to the total triazines can be represented by the following formula (4);

Molar ratio=Tr/(Tr+Tm) (4)

Hereinafter, this molar ratio is referred to as "reaction rate of triazines".

Next, a typical production method for obtaining the triazine-modified novolak resin of the present invention will be described below.

The method comprises (i) a process for adjusting a pH of a system of a mixture of phenols, triazines and aldehydes in a range of 5 to 10, (ii) a process for reacting the mixture under the condition wherein the aldehydes are not volatilized and (iii) a process for removing a reaction water in the system; as a first step reaction, the processes (i), (ii) and (iii) are successively effected; then as a second step reaction, processes (ii) and (iii) are successively effected at a higher temperature than that of the first step reaction; thereafter as a third step reaction, processes (ii) and (iii) are successively effected at a higher temperature than that of the second step reaction.

Firstly, the explanation will be provided regarding the above-described (i) the process for adjusting a pH of a system of a mixture of phenols, triazines and aldehydes in a range of 5 to 10, (ii) the process for reacting the mixture under the condition wherein the aldehydes are not volatilized and (iii) the process for removing a reaction water in the system.

Process (i) is one wherein the above-described phenols, triazines and aldehydes are mixed and the pH of the system is adjusted at 5 to 10, preferably 7 to 9. As long as the pH is adjusted within the above-described range, a catalyst is not particularly required to be used. However, catalyst comprising a basic compound or a weak-acidic compound can be optionally added to the system.

As the catalyst, for example, mention may be made of oxides or hydroxides of alkali metals and alkali earth metals such as sodium hydroxide, potassium hydroxide and barium hydroxide; basic catalysts such as ammonia, primary to tertiary amines, hyxamethylenetetramine and sodium carbonate: and weak-acidic catalysts such as zinc acetate, zinc naphthate and manganese octylate. Among these catalysts, triethylamine, triethanolamine and other amines can be more preferably used.

The reaction order of each starting material is not particularly limited. Namely, triazines can be added after the addition of phenols and aldehydes. Alternatively, phenols can be added to aldehydes and triazines. However, in order to achieve the effect of the present invention, it is preferable that phenols, aldehydes and triazines are simultaneously added to effect reaction. At that time, the molar ratio of aldehydes to phenols and triazines is not particularly limited. However, it is preferably 1:0.2 to 0.9, more preferably 1:0.4 to 0.7. While the weight ratio of phenols to triazines is not particularly limited, it is preferably 10 to 98:90 to 2, more preferably 30 to 95:70 to 5. When the weight ratio of phenols is less than 10% by weight, a resin is difficult to be formed. While, if it is more than 98% by weight, sufficient flame retardant effects undesirably cannot be obtained.

Process (ii) is one wherein the above-described mixture is allowed to react under the condition that the aldehydes are not volatilized in the above-described pH range and if necessary, in the presence of the above-described catalyst. The condition under which aldehydes are not volatilized means such a reflux condition that the volatile components in the system is returned therein. Namely, such condition means a case wherein a substance having a low boiling point in the system is reacted at a temperature around the boiling point. By reacting all aldehyde, a resin designed in terms of a charge molar ratio can be stably obtained with a good reproducibility.

Further, in view of controlling the reaction, the reaction can be carried out in the presence of various solvents.

The solvent to be used is not particularly limited. Examples of the same can include acetone, MEK, toluene, xylene, methyl isobutyl ketone, ethyl acetate, ethylene glycol monomethylether, N,N-dimethyl formamide, methanol and ethanol. They can be used alone or in any mixture thereof.

Thereafter, depending upon a necessity, rinsing with water is effected to eliminate remaining catalyst and impurities.

Process (iii) is one wherein reaction water and solvents in a system are removed according to a conventional method such as atmospheric distillation. In order to eliminate reaction water and the like, it is desirable to gradually raise the temperature in the system in this process (iii) to at least 120° C.

In accordance with the present invention, as a first step reaction, the processes (i), (ii) and (iii) are successively effected; then as a second step reaction, processes (ii) and (iii) are successively effected at a higher temperature than that of the first step reaction; thereafter as a third step reaction, processes (ii) and (iii) are successively effected at a higher temperature than that of the second step reaction.

Namely, the reaction is effected with preventing aldehydes in the system from volatilization, then reaction water and solvents in the system are removed according to a conventional method such as atmospheric distillation, thereafter, the reaction is effected again with preventing aldehydes in the system from volatilization, successively is repeated twice or more a process wherein reaction water and solvents in the system are removed according to a conventional method such as atmospheric distillation at a higher temperature than that of the previous process.

In process (iii) in the third step reaction, distillation is effected under vacuum at a temperature of 150° C. or more, preferably 170°C. or more to remove reaction water and other substances. In this case, unreacted formaldehyde and unreacted phenols monomer can be removed together with water.

Further, depending upon a necessity, process (ii) and process (iii) can be repeated again. By the second step reaction and the third step reaction, a dimethylene ether bond formed by the condensation between methylol groups can be converted to methylene bond. Thus, not only can be obtained the bond ratio between phenols and triazines which is the feature of the novolak resin of the present invention, but also the molecular weight of the resin can be appropriately controlled. In accordance with the present invention, process (ii) and process (iii) are repeated in the second step reaction and the third step reaction. Further, these processes are repeated depending upon a necessity. Two or three times repeats are preferable. In other words, from the first step reaction to the third step reaction or the forth step reaction are preferably effected.

The phenol resin composition of the present invention can be used as a hardener for an epoxy resin.

As the epoxy resin in this case, for example, mention may be made of bisphenol A type epoxy resin, polyphenol type epoxy resin, aliphatic epoxy resin, aromatic ester type epoxy resin, cyclic aliphatic ester type epoxy resin, aliphatic ester type epoxy resin, ether ester type epoxy resin, nonglycidyl epoxy resin such as epoxydized soybean oil, and halogen (e.g., bromine or chlorine) substituted products thereof. These epoxy resins can be used alone or in any mixture thereof. In the use of the epoxy resin composition, a solvent to be used for the same is not particularly limited and the above-described various solvents can be mentioned. Further, depending upon a necessity, various additives, flame retardants and fillers can be optionally formulated.

A mixing ratio of an epoxy resin and the phenol resin composition of the present invention is not particularly limited. The phenolic hydroxyl group equivalent of the phenol resin composition to 1 equivalent of an epoxy group is preferably 0.5 to 2.0 equivalents, more preferably 0.9 to 1.4 equivalents.

While, in hardening an epoxy resin, various hardening accelerators generally used for hardening an epoxy compound can be used depending upon a necessity. The examples of this hardening accelerator include imidazole and the derivatives thereof, phosphine compounds, amines and $BF_3$ amine compounds.

The phenol resin composition of the present invention can be used for a friction material and molding material with formulating a hardener therewith. The hardener is not particularly limited. The examples of the hardener include substances which generate formaldehyde upon heating such as hexamethylenetetramine and paraformaldehyde; and compounds having two or more unsaturated ethylene groups such as bisallylnadicamide, bismaleimide and diacrylate. Among these, hexamethylenetetramine or bismaleimide is preferable. A hardening accelerator can be optionally used together with these hardeners. As the hardening accelerator, those usually used for hardening epoxy compounds as described above can be used.

A friction material using the phenol resin composition of the present invention as the binder for the same can be obtained by adding a fiber base and a hardener to the phenol resin composition, followed by thermally hardening, according to the present invention. As the fiber base, for example, mention may be made of inorganic fibers such as glass fiber, ceramic fiber, asbestos fiber, carbon fiber and stainless fiber; natural fibers such as cotton and hemp; and synthetic organic fibers such as polyester and polyamide. These fibers can be used alone or in any mixture thereof. Among these, by taking the performance and price into account, the fiber base mainly consisting of glass fiber is preferable. The shape of the fiber base is also not particularly limited. It can have any shape such as short fiber, long fiber, yarn, mat or sheet. While as the hardener, those as described above can be used.

The thermal hardening condition of this composition is not particularly limited. The condition can be the same as the usual one under which phenol resin is hardened. Namely, the hardening is effected at a temperature of 120° C. to 200° C. In such a temperature range, a resin component is usually softened. In order to prevent the composition from molding failure, hardening is preferably effected at 130 to 180° C. For obtaining a friction material further excellent in thermal resistance, calcination is preferably effected after molding.

When the phenol resin composition of the present invention is used as a friction material, a filler, an additive, etc. can be further added thereto. As the filler and the additive, those conventionally known can be used. The examples of the same include silica, barium sulfate, calcium carbonate, silicon carbide, cashew oil polymerizate, molybdenum disulfide, aluminum hydroxide, talc, clay, graphite, rubber particle, aluminum powder, copper powder and brass powder. These fillers can be used alone or in any mixture thereof. Further, the amount thereof to be used should be controlled depending upon a use or a required performance.

The phenol resin composition of the present invention is added with resol resin and can be used as a binder for a paper base laminated sheet. The resol resin in this case is a thermosetting resin including a methylol group which is a low molecular weight condensation resin obtained by reacting phenols such as phenol, cresol, butyl phenol, nonyl phenol, xylenol or resorcin with aldehydes such as formaldehyde in the presence of a basic catalyst. While, the resol resin can be a drying oil modified resin using phenols modified with a drying oil such as tung oil, dehydrated castor oil, linseed oil or tall oil. Further, it can be a low molecular weight condensation resin obtained by reacting aldehydes such as formaldehyde with melamine or guanamine in the presence of a basic catalyst. Still further, it can be those wherein methylol groups are partially or entirely etherified with a lower alcohol such as methanol or butanol. These resins can be used alone or in any mixture thereof. In order to achieve compatibility of impregnation property with punching quality, it is preferable to use a low molecular weight condensation resin together with a drying oil modified resol resin.

The basic catalyst herein means the above-described ammonia, an amine catalyst or metal hydroxide.

The mixing ratio of the phenol resin composition of the present invention with a resol resin is not particularly limited. However, a solid content weight ratio in a mixture is preferably; the phenol resin composition:a resol resin=5 to 50:100.

If the phenol resin composition of the present invention is used in a paper base laminated sheet, depending upon a necessity, other thermosetting resins can be used together.

As the other thermosetting resins, mention may be made of epoxy resin, unsaturated polyester resin and thermosetting acrylic resin. In view of punching quality, epoxy resin is preferable.

Further, depending upon a necessity, various additives, flame retardants, and fillers can be optionally added.

A paper base laminated sheet can be obtained by a lamination-forming a lamination material produced by dissolving the resin composition thus obtained in an organic solvent, depending upon a necessity, to form a varnish, then coating the same on a paper base such as craft paper, linter paper, glass fabric, glass unwoven fabric, polyester fabric, aramid fiber fabric or sailcloth so that the paper base may be impregnated therewith, followed by drying.

In this forming, a formulation procedure for coating and impregnating the phenol resin composition and a resol resin, and the formulation ratio are not particularly limited. However, according to a two step impregnation system wherein the coating and the impregnation of phenol resin are effected, it is preferable to use a low molecular weight resol resin as a resin for the impregnation in the first step and to use a drying oil modified resol resin and the phenol resin composition of the present invention as resins for impregnation in the second step.

The present invention will be further illustrated in detail by way of Examples below.

EXAMPLE 1

A 45 parts amount of 41.5% formalin and 0.4 part of triethylamine were added to 94 parts of phenol and 12 parts of benzoguanamine. The pH of the resulting system was adjusted at 8.2 and the temperature of the system was gradually raised to 100° C. during which exotherm was carefully watched. After reacting at 100° C. for 5 hours, the temperature was raised to 120° C., which took 2 hours, with removing water under atmospheric pressure. Next, the reaction was further conducted for 3 hours under reflux, successively the temperature was raised to 160° C., which took 2 hours, with removing water under atmospheric pressure. Further, after reacting for 3 hours under reflux, the temperature was raised to 180° C., which took 2 hours, with removing water under atmospheric pressure. Then, unreacted phenol was removed under a reduced pressure to obtain a phenol resin composition having a softening point of 111° C.

Hereinafter, this composition is abbreviated as "N1".

In the resulting composition, a weight ratio between the phenols and the triazines, an amount of the unreacted formaldehyde, presence or absence of methylol groups, a molar ratio between the constituent unit A and the constituent unit B, an amount of the unreacted phenol monomer, and a reaction rate of the triazines were obtained as follows.

Weight ratio between Phenol and triazines (benzoguanamine)

The phenol content in the effluent removed from the reaction system at 180° C. under a reduced pressure was calculated according to gas chromatography. The value obtained was subtracted from the charged phenol amount. The calculated value thus obtained was regarded as the existent amount of phenol in the resin composition. The benzoguanamine was regarded to be included in the charged amount as it is in the composition. The ratio between them was regarded as the existence ratio thereof.

Column: 30% Celite 545 carnauba wax 2 m×3 mmφ
Column temperature: 170° C.
Inlet temperature: 230° C.
Detector: FID
Carrier gas: $N_2$ gas 1.0 kg/cm$^2$
Determination method: Internal standard method
Unreacted formaldehyde amount About 5 g of finely divided composition N1 was added to 50 g of distilled water. Then, the resulting mixture was kept at room temperature for 24 hours and a pH meter was set therein. Successively, aqueous N/10 hydrochloric acid solution was added thereto to adjust pH at 4.0, to which was added 50 ml of aqueous 7% hydroxylamine solution adjusted to have pH of 4.0. The resulting mixture was sealed with aluminum foil and allowed to stand for 30 minutes. Thereafter, a pH meter was set therein and titration with an aqueous 1N sodium hydroxide solution was effected until the mixture was neutralized at pH of 4.0. The amount of free formaldehyde was determined according to the following formula.

Unreacted (free) formaldehyde (%)

=(T×F×30)/(S×1000)×100

S: sample amount (g)
F: factor of 1N sodium hydroxide
T: titration amount of 1N sodium hydroxide
Presence or absence of methylol group Were determined methylol groups present in the resin composition N1 using $^{13}$C-NMR.
Apparatus: Type GSX270 manufactured by JEOL Ltd.
Proton: 270 MHZ
Determination solvent: DMSO or acetone-$D_6$
Standard substance: tetramethylsilane Determination conditions
Pulse condition: 45°×10,000 times
Pulse interval: 2 seconds
Peaks appeared at 60 to 70 ppm of the chart obtained, which were judged using peaks clearly distinguishable with noises. When the peak was confirmed, such case is regarded as "presence". While, when the peak was not confirmed, such case is regarded as "absence".

Molar ratio between constituent unit A and constituent unit B

It was calculated using $^{13}$C-NMR chart determined under the same conditions as those of the determination of methylol groups.

The integral value of the peak appears in a range of 42.5 to 45 ppm of the chart was regarded as Bp and that of the peak appears in a range of 47 to 48.5 ppm of the chart was regarded as Ap. Thus, the molar ratio was obtained using these values according to the following formula.

Constituent unit B/Constituent unit A=Bp/Ap
Unreacted phenol monomer amount

The phenol monomer content in the effluent was determined under the same conditions as those of the above-described gas chromatography.

Reaction rate of triazines

It was calculated using $^{13}$C-NMR chart determined under the same conditions as those of the above-described determination of methylol groups.

The integral value of the sharp peak appears in a range of 167.2 to 167.4 ppm of the chart was regarded as Tm and that of the peak appears in a range of 163 to 167.2 ppm of the chart was regarded as Tr. Thus, the reaction rate was obtained using these values according to the following formula.

Reaction rate %=Tr/(Tr+Tm)×100

The amounts of respective components thus obtained are shown together in Table 1.

EXAMPLE 2

A 45 parts amount of 41.5% formalin and 0.4 part of triethylamine were added to 94 parts of phenol and 18 parts of melamine. The pH of the resulting system was adjusted at 8.2 and the temperature of the system was gradually raised to 100° C. during which exotherm was carefully watched. After reacting at 100° C. for 5 hours, the temperature was raised to 120° C., which took 2 hours, with removing water under atmospheric pressure. Next, the reaction was further conducted for 3 hours under reflux, successively the temperature was raised to 140° C., which took 2 hours, with removing water under atmospheric pressure. Further, after reacting for 3 hours under reflux, the temperature was raised to 160° C., which took 2 hours, with removing water under atmospheric pressure. Still further, after reacting for 3 hours under reflux, the temperature was raised to 180° C., which took 2 hours, with removing water under atmospheric pressure. Then, unreacted phenol was removed under a reduced pressure to obtain a phenol resin composition having a softening point of 128° C. In the resulting composition, a weight ratio between phenol and melamine, an amount of unreacted formaldehyde, presence or absence of methylol groups, a molar ratio between the constituent unit A and the constituent unit B, an amount of unreacted phenol monomer, and a reaction rate of the triazines were obtained as in Example 1 and are shown together in Table 1.

Hereinafter, this composition is abbreviated as "N2".

EXAMPLE 3

A 94 parts amount of phenol, 70 parts of benzoguanamine, 47 parts of 41.5% formalin and 0.5 part of triethylamine were added and pH of the resulting system was controlled to have 7.8, which was reacted at 80°C. for 3 hours. The temperature of the system was raised to 120° C. with removing water under atmospheric pressure and the reaction was effected for 2 hours while keeping that temperature. Successively the temperature was raised to 160° C., which took 2 hours, with removing water under atmospheric pressure and the reaction was effected for 2 hours while keeping that temperature. Further, the temperature was raised to 180° C., which took 2 hours, with removing water under atmospheric pressure. Then, unreacted phenol was removed under a reduced pressure to obtain a phenol resin composition having a softening point of 135° C. In the resulting composition, a weight ratio between phenol and benzoguanamine, an amount of unreacted formaldehyde, presence or absence of methylol groups, a molar ratio of the constituent unit B, an amount of unreacted phenol monomer, and a reaction rate of the triazines were obtained as in Example 1 and are shown together in Table 1.

Hereinafter, this composition is abbreviated as "N3".

EXAMPLE 4

A 45 parts amount of 41.5% formalin and 0.4 part of triethylamine were added to 94 parts of phenol and 9 parts of melamine. The pH of the resulting system was adjusted at 8.2 and the temperature of the system was gradually raised to 100° C. during which exotherm was carefully watched. After reacting at 100° C. for 5 hours, the temperature was raised to 120° C., which took 2 hours, with removing water under atmospheric pressure. Next, the reaction was further conducted for 3 hours under reflux, successively the temperature was raised to 140° C., which took 2 hours, with removing water under atmospheric pressure. Further, after reacting for 3 hours under reflux, the temperature was raised to 160° C., which took 2 hours, with removing water under atmospheric pressure. Still further, after reacting for 3 hours under reflux, the temperature was raised to 180° C., which took 2 hours, with removing water under atmospheric pressure. Then, unreacted phenol was removed under a reduced pressure to obtain a phenol resin composition having a softening point of 120° C. In the resulting composition, a weight ratio between phenol and melamine, an amount of unreacted formaldehyde, presence or absence of methylol groups, a molar ratio between the constituent unit A and the constituent unit B, an amount of unreacted phenol monomer, and a reaction rate of the triazines were obtained as in Example 1 and are shown together in Table 1.

Hereinafter, this composition is abbreviated as "N4".

COMPARATIVE EXAMPLE 1

A 94 parts amount of phenol, 12 parts of benzoguanamine, 45 parts of 41.5% formalin and 0.6 part of 48% sodium hydroxide were added and the pH of the resulting system was controlled at 8.2, which was reacted at 100° C. for 2 hours. The temperature of the system was raised to 180° C. with removing water under atmospheric pressure. Then, unreacted phenol was removed under a reduced pressure to obtain a phenol resin composition having a softening point of 118° C. In the resulting composition, a weight ratio between phenol and benzoguanamine, an amount of unreacted formaldehyde, presence or absence of methylol groups, a molar ratio of the constituent unit B, an amount of unreacted phenol monomer, and a reaction rate of the triazines were obtained as in Example 1 and are shown together in Table 1.

Hereinafter, this composition is abbreviated as "N5".

COMPARATIVE EXAMPLE 2

A 94 parts amount of phenol, 12 parts of benzoguanamine, 50 parts of 41.5% formalin and 0.3 part of oxalic acid were added and pH of the resulting system was controlled at 5.4, which was reacted at 100° C. for 2 hours. The temperature of the system was raised to 180° C. with removing water under atmospheric pressure. Then, unreacted phenol was removed under a reduced pressure to obtain a phenol resin composition having a softening point of 120° C. In the resulting composition, a weight ratio between phenol and benzoguanamine, an amount of unreacted formaldehyde, presence or absence of methylol groups, a molar ratio of the constituent unit B, an amount of unreacted phenol monomer, and reaction rate of the triazines were obtained as in Example 1 and are shown together in Table 1.

Hereinafter, this composition is abbreviated as "N6".

TABLE 1

| Comp. | Phenols/ triazines | Unreacted formaldehyde (%) | Presence or absence of methylol | Molar ratio B/A | Unreacted phenol (%) | Triazines reaction rate (%) |
| --- | --- | --- | --- | --- | --- | --- |
| N1 | 85/15 | 0 | absence | 7.0 | 0.3 | 92 |
| N2 | 81/19 | 0 | absence | 5.6 | 0.4 | 78 |
| N3 | 53/47 | 0 | absence | 4.7 | 0.5 | 88 |
| N4 | 88/12 | 0 | absence | 2.7 | 0.3 | 95 |
| N5 | 84/16 | 0 | absence | 0.8 | 0.5 | 12 |
| N6 | 86 14 | 0 | absence | 1.3 | 0.3 | 28 |

EXAMPLES 5 TO 7 AND COMPARATIVE EXAMPLES 3 AND 4

Compound N1, N2, N4, N5 or N6 as a hardener and 2-ethyl-4-methylimidazole (hereinafter abbreviated as 2E4MZ) as a hardening accelerator were formulated with 100 parts of Epiclon 850 (Epoxy resin, epoxy equivalent 190, produced by Dainippon Ink and Chemicals, Inc.) in a proportion shown in Table 2. While, the accelerator was previously added to a hardener resin and melted while keeping at 170° C. Similarly heated epoxy resin was added thereto, the resulting mixture was sufficiently stirred to be poured into a glass mold having a thickness of 3 mm, which was hardened by heating at 180° C. for 2 hours. Thus, a cast sheet could be obtained.

Respective physical tests were effected regarding the cast sheet obtained and the results shown in Table 2 were obtained.

TABLE 2

| | Example | | | Comparative Example | |
| --- | --- | --- | --- | --- | --- |
| | 5 | 6 | 7 | 3 | 4 |
| Epiclon 850 (part) | 100 | 100 | 100 | 100 | 100 |
| Hardener (part) | | | | | |
| N1 | 65 | | | | |
| N2 | | 65 | | | |
| N4 | | | 65 | | |
| N5 | | | | 65 | |
| N6 | | | | | 65 |
| 2E4MZ (part) | 0.1 | 0.1 | 0.1 | 0.1 | 0.1 |

TABLE 2-continued

|  | Example | | | Comparative Example | |
|---|---|---|---|---|---|
|  | 5 | 6 | 7 | 3 | 4 |
| Physical property and test | | | | | |
| Glass transition temp. Tg [TMA method] ° C. | 146 | 153 | 148 | 135 | 112 |
| Boiling water absorption (boiling for 1 hr.) weight change % | 0.3 | 0.3 | 0.3 | 0.4 | 0.5 |
| Fire-extinguishing property (UL method extinction time) second *1 | 30 | 10 | 17 | 40 | burning |

*1: Extinguishing property test

A test piece having a width of 12.7 mm was set vertically and subjected to flame for 10 seconds and a time taken for self-extinguishing was measured as extinction time. The evaluation of "burning" was made when burning continued for 2 or more minutes or the test piece burned to the point 5 cm from the lower end.

EXAMPLE 8 AND COMPARATIVE EXAMPLES 5 AND 6

Respective 100 parts of phenol resin compositions N2, N5 and N6 were added with 10 parts of hexamethylenetetramine, which were mixed and pulverized to obtain powdery hardening resin composition. To 15 parts of this composition were added 55 parts of glass fiber (chopped strand), 5 parts of aramid fiber, 8 parts of cashew oil polymerizate, 7 parts of graphite, 5 parts of barium sulfate and 5 parts of calcium carbonate, which were mixed in a mixer to obtain a thermosetting resin composition for a friction material.

APPLICATION EXAMPLE 1 AND COMPARATIVE APPLICATION EXAMPLES 1 AND 2

The thermosetting resin compositions for friction materials obtained in the above-described Example 8 and Comparative Examples 5 to 6 were placed into a mold having a temperature of 160° C., to which compression molding processing was applied by means of a pressing machine as in a well-known general method to obtain a molded product. The product taken from the mold was heated at 200° C. for 2 hours and then calcinated, whereby a molded product was obtained. The molded product was cut out to obtain test pieces having a given size. The test pieces obtained were subjected to a friction performance test (JIS D-4411) and the results were compared and evaluated. The results are shown together in Table 3.

It should be noted that the unit of the friction rate is 10 to 7 cm/kg·m.

TABLE 3

|  | Application Example | Comp. Application Example | |
|---|---|---|---|
|  | 1 | 1 | 2 |
| Used resin | N2 | N5 | N6 |
| Coefficient of friction | | | |
| 100° C. | 0.49 | 0.46 | 0.43 |
| 150° C. | 0.48 | 0.45 | 0.42 |
| 200° C. | 0.48 | 0.45 | 0.41 |
| 250° C. | 0.47 | 0.44 | 0.41 |
| 300° C. | 0.46 | 0.43 | 0.40 |
| 350° C. | 0.45 | 0.43 | 0.40 |
| Friction rate | | | |
| 100° C. | 0.8 | 0.9 | 1.3 |
| 150° C. | 0.9 | 1.0 | 1.4 |
| 200° C. | 1.6 | 1.9 | 2.3 |
| 250° C. | 1.8 | 2.4 | 3.2 |
| 300° C. | 3.6 | 4.4 | 5.2 |
| 350° C. | 10.3 | 11.8 | 14.3 |
| Judder | none | present | present |

EXAMPLES 9 AND COMPARATIVE EXAMPLES 7 AND 8

Triphenyl phosphine was added to each compound N3, N5 and N6. The resulting mixture was melted at 200° C. Successively, an imide compound having an unsaturated ethylene group was added thereto in a proportion as shown in Table 4. The resulting mixture was melted and mixed, and further sufficiently stirred to be poured into a glass mold having a thickness of 3 mm, which was hardened by heating at 180° C. for 2 hours and then 200° C. for 2 hours. Thus, a casting sheet could be obtained. Respective physical tests were effected regarding the casting sheet obtained and the results shown in Table 4 were obtained.

TABLE 4

|  | Example | Comp. Example | |
|---|---|---|---|
|  | 9 | 7 | 8 |
| Formulation (part) | | | |
| N3 | 100 | | |
| N5 | | 100 | |
| N6 | | | 100 |
| 4,4'-diphenyl-methanebismaleimide | 100 | 100 | 100 |
| triphenyl phosphine | 1 | 1 | 1 |
| Molding state | good | good | uneven hardening |
| Physical property and test | | | |
| Glass transition temp. Tg (DNA) ° C | 225 | 185 | 178 |
| Boiling water absorp. (boiling for 1 hr.) % | 0.3 | 0.6 | 1.0 |
| Coefficient of thermal expansion (50–100° C.) ppm | 36 | 42 | 43 |
| Dielectric constant (1MHZ) | 3.8 | 3.9 | 3.9 |
| Dielectric loss tangent (1MHZ) | 0.01 | 0.02 | 0.02 |
| UL extinguishing test | V-0 | V-0 | V-1 |

APPLICATION EXAMPLE 2 AND COMPARATIVE APPLICATION EXAMPLE 3 AND 4

N2, N5 or N6 as a hardener was formulated in the amount shown in Table 5 with 100 parts of Epiclon 850. In this formulation, Epiclon 850 and the hardener previously had been dissolved in a mixed solvent of methyl ethyl ketone/dimethyl formamide=50/50 in terms of weight ratio, and, then used. Successively, as a hardening accelerator, 0.2 part of 2E4MZ was added to each solvent solution and an amount of a non-volatile component of the solution was adjusted with methyl ethyl ketone at 55%. Thus, mixed solutions of Application Example 2 and Comparative Application Example 3 to 4 were prepared.

Thereafter, glass cloth was impregnated with each mixed solution, then dried at 160° C. for 3 minutes to obtain a prepreg. Eight sheets of this prepreg were piled up and on the both ends thereof, copper foil having a thickness of 35μ was superposed, which were heat-pressure molded for one hour at a temperature of 170° C. and a pressure of 40 kgf/cm$^2$ to obtain a double-sided copper-coat laminated sheet having a thickness of 1.5 mm.

Next, the laminated sheet was subjected to an etching treatment so that the copper foil was eliminated. Thereafter, respective physical property tests were effected. The results are shown in Table 5.

*1: temperature rising speed 3° C./min
*2: Pressure-cooking test (PCT) was effected by treating a test piece in a steam at 120° C. for a given period.
*3: A soldering resistance test was effected by immersing a test piece having been subjected to PCT treatment in a soldering bath having a temperature of 260° C. for 20 seconds, then evaluating the immersed test piece.

The evaluation was effected by observing the appearance of the test piece, particularly, by visually judging the presence or absence of measling.
o: entirely no abnormality Δ: Slight measling occurs X: Measling occurs

TABLE 5

|  | Application Ex. | Comp. Appli. Ex. | |
| --- | --- | --- | --- |
|  | 2 | 3 | 4 |
| Epiclon 850 (parts) | 100 | 100 | 100 |
| Hardener (part) | | | |
| N2 | 65 | | |
| N5 | | 65 | |
| N6 | | | 65 |
| 2E4Mz (part) | 0.2 | 0.2 | 0.2 |
| Physical property and test | | | |
| Glass transition temp. Tg. [DMA method] ° C.*1 | 161 | 148 | 128 |
| Peeling strength [ordinary room temp.] (kg/cm) | 2.3 | 2.2 | 1.9 |
| Interlaminar peel strength [ordinary room temp.] (kg/cm) | 1.8 | 2.0 | 1.8 |
| Pressure cooking test*2 | | | |
| Water absorption | | | |
| 2 hrs (%) | 0.22 | 0.28 | 0.34 |
| 4 hrs (%) | 0.32 | 0.39 | 0.45 |

TABLE 5-continued

|  | Application Ex. | Comp. Appli. Ex. | |
| --- | --- | --- | --- |
|  | 2 | 3 | 4 |
| Moisture resistancee soldering resistance*3 | O | O | X |
| Extinguishing property | V-1 | V-1 | burning |

APPLICATION SYNTHETIC EXAMPLE 1

(Synthetic Example of Resol Resin)

A 94 parts amount of phenol, 87 parts of 41.5% formalin and 1.9 parts of triethylamine were added and the resulting mixture was reacted for 2 hours at 60° C. Next, water was eliminated under a reduced pressure and, then, diluted with a mixed solvent of methanol/water=70/30 to obtain a low molecular weight resol resin varnish having a resin content of 50%.

Hereinafter, this resin varnish is abbreviated at "W1".

APPLICATION SYNTHETIC EXAMPLE 2

(Synthetic Example of Resol Resin)

A 94 parts amount of phenol, 60 parts of tung oil and 0.5 part of p-toluene sulfonic acid were added and the resulting mixture was reacted at 80° C. for 3 hours. Next, 60 parts of toluene and 2 g of triethanolamine were added to the mixture to dilute the same, followed by neutralization. Thereafter, 40 parts of paraformaldehyde and 2.4 parts of 25% aqueous ammonia were added to the resulting neutralized product, then the resulting mixture was reacted at 90° C. for 4 hours. Then, 12 parts of a brominated epoxy resin (Epiclon 153, manufactured by Dainippon Ink and Chemicals, Inc.) and 12 parts of triphenyl phosphate were added thereto, followed by diluting the resulting mixture with a mixed solvent of methanol/toluene=50/50 to obtain tung oil-modified resin varnish having a resin content of 50%.

Hereinafter, this resin varnish is abbreviated as "W2".

APPLICATION EXAMPLE 3 AND COMPARATIVE APPLICATION EXAMPLES 5 AND 6

W1 and W2 as well as N2, N5 and N6 in the proportion. shown in Table 6 were mixed and dissolved to form uniform solutions. Then craft paper of 135 g/m$^2$ was coated and impregnated with the resulting solution. The craft paper thus obtained was dried to obtain a prepreg having a resin content of 52 to 55%. Eight sheets of this prepreg were piled up, which were heat-pressure molded for 60 minutes at a temperature of 160° C. and a pressure of 80 kgf/cm$^2$ to obtain a laminated sheet having a thickness of 1.6 mm.

Various properties obtained from the laminated sheet are shown in Table 6.

Test methods, water absorption and insulation resistance according to JIS C6481, and punching quality according to ASTM D-617 were employed.

TABLE 6

|  | Test condition | Appli Ex. 3 | Comp. Appli. Ex. 5 | Comp. Appli. Ex. 6 |
|---|---|---|---|---|
| Formulation (part) | | | | |
| W1 | — | 10 | 10 | 10 |
| W2 | — | 100 | 100 | 100 |
| N2 | — | 20 | | |
| N5 | — | | 20 | |
| N6 | — | | | 20 |
| Properties of laminated sheet | | | | |
| Water absorp. rate % | 24 hours immersion in water | 0.65 | 0.69 | 0.78 |
| Insulation resistance $\times 10^{10} \Omega$ | after boil | 6 | 5 | 3 |
| Punching quality | 20° C. | good | fair | fair |
|  | 30° C. | good | good | fair |
|  | 50° C. | good | good | poor |
| Extinguishing property | UL94 | V-O | V-O | V-1 |

The phenol resin composition of the present invention can provide a hardened product excellent in flame retardancy, heat resistance, moisture resistance and metal adhesion when used as an epoxy resin hardener. Further, it can improve flame retardancy without using halogen and can be employed in various uses using an epoxy resin, for example, sealing, lamination and paint, particularly in a glass epoxy laminated sheet and IC encapsulating material. Further, it is excellent in friction property and dielectric property and, therefore, can be used in a friction material and molding material. Still further, since it is excellent in flame retardancy and low temperature punching quality, it can be used for a paper base laminated sheet.

While the invention has been described in detail and with reference to specific embodiments thereof, it will be apparent to one skilled in the art that various changes and modifications can be made therein without departing from the spirit and scope thereof.

What is claimed is:

1. A phenol resin composition containing a triazine-modified novolak resin comprising the reaction product of a phenol, triazines and aldehyde, wherein said novolak resin comprises a mixture of (a) a condensate of phenol, triazine and aldehyde, (b) a condensate of triazine and aldehyde, (c) a condensate of phenol and aldehyde, (d) phenol and (e) triazine, and a constituent unit (A) represented by the following general formula (1) and a constituent unit (B) represented by the following general formula (2) are included in said condensate (a) and said condensate (b) at a molar ratio satisfying the following formula (3);

$$(-X-NH-CH_2-NH-) \quad (1)$$

$$(-X-NH-CH_2-Y-) \quad (2)$$

wherein X represents a residual group of a triazine, Y represents a residual group of a phenol, and $$B/A \geq 1.5 \quad (3).$$

2. The composition as claimed in claim 1, wherein the molar percentage of triazine in the condensate (a) and the condensate (b) comprises 30% or more of the total triazine present in said composition.

3. The composition as claimed in claim 1, wherein the triazine is selected from the group consisting of melamine, acetoguanamine and benzoguanamine and a mixture thereof.

4. The composition as claimed in claim 1, wherein the phenol resin composition further comprises a hardener.

5. The composition as claimed in claim 4, wherein the hardener is hexamethylenetetramine.

6. The composition as claimed in claim 4, wherein the hardener is a compound having at least two unsaturated ethylene groups in its molecule.

7. The composition as claimed in claim 6, wherein the compound having at least two unsaturated ethylene groups in its molecule is a bismaleimide.

8. The composition as claimed in claim 1, wherein the phenol resin composition further comprises a resol resin.

9. A hardener for an epoxy resin comprising the phenol resin composition described in claim 1.

10. A binder for a friction material comprising the phenol resin composition described in claim 1.

11. A binder for a paper base laminated sheet comprising the phenol resin composition described in claim 1.

12. A method for producing a triazine-modified novolak resin of claim 1 comprising the steps of:

as a first step reaction, successively effecting processes (i), (ii) and (iii), wherein said process (i) is a process of adjusting the pH of a system of a mixture of phenol, triazine and aldehyde to 5 to 10, said process (ii) is a process of reacting said mixture under conditions under which aldehydes are not volatilized and said process (iii) is a process of removing reaction water from the system;

then as a second step reaction, successively effecting said processes (ii) and (iii) at a higher temperature than that of the first step reaction;

thereafter as a third step reaction, successively effecting said processes (ii) and (iii) at a higher temperature than that of the second step reaction; and further optionally repeating the second step reaction and the third step reaction, whereby dimethylene ether bonds are converted to methylene bonds in the resulting reaction products.

13. The method as claimed in claim 12, wherein the molar ratio between the phenols and the triazines, and the aldehydes is 1:0.2 to 0.9.

* * * * *